Dec. 22, 1942.   R. H. STONE   2,305,644
FLEXIBLE RADIO SHIELDING CONDUIT
Filed Dec. 4, 1939

R. H. Stone   INVENTOR.
BY Thomas Howe
ATTORNEY.

Patented Dec. 22, 1942

2,305,644

UNITED STATES PATENT OFFICE 2,305,644

FLEXIBLE RADIO SHIELDING CONDUIT

R. Harry Stone, Bound Brook, N. J., assignor to Titeflex Metal Hose Co., a corporation of New Jersey Application December 4, 1939, Serial No. 307,431

6 Claims. (Cl. 138—60)

This invention relates to conduits especially for electrical conductors and more particularly to such conduits adapted to provide radio shielding.

Conduits of the character described should be fluid-tight, should be strong against expansion, elongation or collapse, the conductor or conductors should be well insulated and, in the case of use on aeroplanes, they should be light in weight.

To the end of producing a conduit of the character as indicated it is proposed to employ a hose or tube of rubber or rubber-like material, that is material which is flexible, insulating and fluid-tight. A considerable number of such rubber-like materials are synthetically produced and now on the market, and some of them are immune to a comparatively high degree of heat and to deterioration by various chemicals as for instance petroleum and the products thereof, including gasoline and lubricating oils, and also acids and other chemicals. It may often be preferable to use such rubber-like materials having one or more of the desired immunities as indicated, in place of rubber proper where the hose is subjected to such substances or heat, it being well known, for instance, that rubber proper is peculiarly susceptible to attack and destruction by gasoline, oil and other petroleum products.

The proposed conduit also includes a flexible, tubular, metallic covering outside the rubber-like hose which acts to mechanically strengthen the conduit against tensile and twisting stresses and serves as a radio shield.

The rubber-like tube may be liable to collapse under conditions of use, and this is especially true where such tube is quite thin as is desirable to reduce weight, especially where the conduit is used in an aeroplane. Also the metallic radio shielding covering, especially when it is formed of a metal braid, may be collapsed by lateral forces exerted upon it, or may tend to contraction or reduction in diameter under tensile and twisting forces. The proposed conduit, therefore, includes a supporting means for re-enforcing the conduit against collapse, that is against any substantial reduction in diameter under the conditions of its use.

The main object of the invention is to provide a conduit of the character as indicated.

Other and ancillary objects of the invention will appear hereinafter.

In the accompanying drawing which illustrates the invention—

Figure 1:
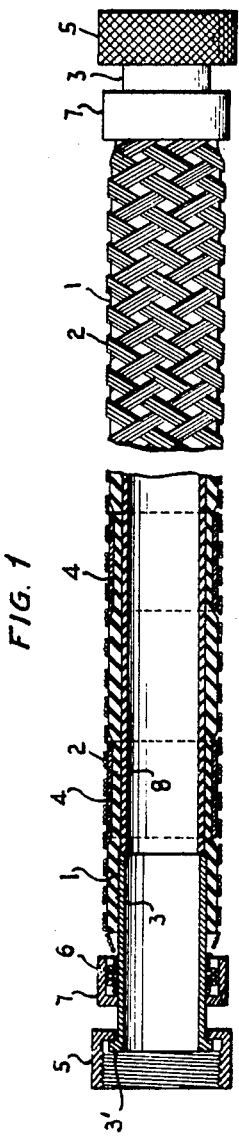
Fig. 1 is a side elevation, partly in axial section, of a conduit embodying the invention.

Referring to the drawing, and first to Fig. 1, the device therein shown comprises rubber or a rubber-like hose or tube 1 about which is a braided covering 2 of metal, the strands of which may each be formed of a plurality of wires laid side by side as illustrated.

Within each end of the tube 1 is tightly inserted a metal tube 3 having a flange 3' at its outer end which retains a swivel nut 5 upon the tube 3, such nut forming a means for connecting the conduit terminal with any desired device. Distributed along the tube 1 and encircling the same are a number of flat bands or rings 4 suitably spaced along the tube so as to provide the necessary support. The braided covering 2 is tightly bound down upon the tube 1 and rings 4, these rings forming indentations to some extent in the tube 1 so that they are prevented from shifting out of their suitably distributed positions longitudinally of the tube, the rings being so distributed as to provide suitable support to prevent any substantial collapse of the conduit. If the indentations in the rubber-like tube 1 should be insufficient to hold the rings 4 in their suitably distributed positions, this might be accomplished by placing a spot of solder between the braid and a ring 4 where such rings are of metal. It may often be desirable, however, to make the rings 4 out of some other material than metal to meet the requirements of any particular case, as for instance these rings might be made of "Bakelite" to lessen the weight of the conduit which is of great importance in connection with aeroplane construction and equipment. Under such circumstances any other suitable means might be employed for securing the rings in their distributed positions if it is found necessary to provide any such means other than the frictional or other engagement of the parts.

The ends of the strands of the braid 2 are pulled down tightly over the end of the rubber-like hose 1, as clearly shown in the drawing and then are bound tightly to the sleeve or tube 3 by tightly wrapping the metal wire 6 about the strand ends and the whole, that is, the wire 6, the strands of the covering 2 and the sleeve 3, are securely fastened together by soldering. A ferrule 7, which had been slid on to the tubes 3 prior to its entry into the tube 1, is then slid into position to cover the wires 6 and the braid ends, and this ferrule is then soldered tightly to the wires 6, the braid ends and the tube 3. A secure and firm joint is thus secured. Although the construction of the terminal or coupling, is shown at one end of the conduit illustrated, it will be understood that the construction at the other end of the conduit is identical.

The rubber-like tube 1, which may be relatively soft and non-resistant, may be subject to collapse and it may also be subject to elongation by pulls upon the tube. Also if the conduit is twisted or is subjected to longitudinal pulls, the tubular braided covering tends to reduce in diameter as to which the soft rubber-like tube offers no adequate resistance and would therefore be liable to be collapsed also.

The rings 4, however, provide support resisting contraction in diameter of the braided covering and to further guard against collapse of the rubber-like tube there is inserted, with a snug fit, in the latter, a tube 8 extending substantially from the terminal or coupling at one end to the terminal coupling at the other end of the conduit. The tube 8 is sufficiently longitudinally flexible to permit the desired longitudinal flexing of the conduit, but of sufficient resistance radially to substantially prevent the collapse of the rubber-like tube. This inner tube 8 should also be of insulating material. As an example, the tube 8 might be that which has been on the market for many years as an electric wiring conduit under the name "circular loom." Such "circular loom" conduit or tube is formed by paper twisted into ropes or strands extending longitudinally of the tube and with other strands extending circumferentially and woven alternately above and below the longitudinally extending strands, the whole then being impregnated with a suitable insulating varnish which lends a certain stiffness to the whole but permits longitudinal flexing of the conduit.

It will be seen from the foregoing that the outer metallic braid is secured to the couplings or terminals of the conduit to resist any tensile or torsional stresses upon the conduit and relieve the rubber-like tube therefrom. The outer metal braid also acts as a radio-shield about the electrical conductors carried in the conduit and such braid permits flexing of the tube but is held against elongation or reduction in diameter by tensile or torsional strains, by means of the supporting rings 4.

It will thus be seen that the conduit is flexible, is strong, is fixed against distortion both longitudinally and radially, is fluid-tight and that any conductor within it is well insulated, it being understood that in addition to the insulation provided by the conduit the conductors would ordinarily carry insulation upon themselves. Also it will be observed that the conduit is light in weight, and this may be increased by making the rubber-like tube relatively thin, and that a radio shield is provided.

Figure 2:
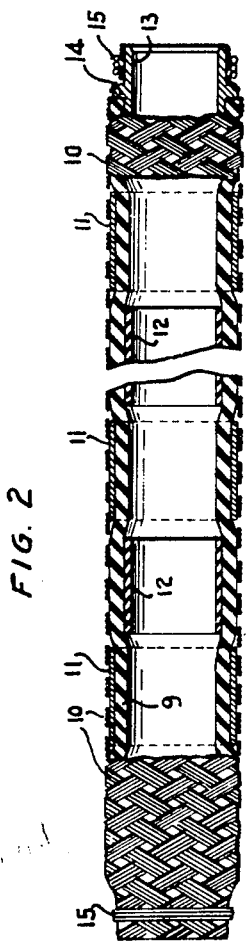
Fig. 2 is a view, in side elevation and partly in axial section, of a modified form of conduit.

Referring now to Fig. 2, there is therein shown a conduit comprising the tube 9 of rubber-like material about which is the radio-shielding and flexible braid 10 of metal strands. The braid 10 is supported against collapse and elongation by means of the metal rings 11 within the braid and outside the rubber-like tube 9, suitably distributed longitudinally of the conduit.

The rubber-like tube is supported upon its interior against collapse by a number of "Bakelite" rings 12 suitably longitudinally distributed and staggered with relation to the rings 11. The metal braid 10 is tightly bound down so as to cause the rings 11 and 12 to indent the rubber-like tube 9 and hold them against shifting longitudinally of the tube. In fact the zigzag course of the tube 9 as it passes inside and outside of the rings 11 and 12 would cause undulations into which the rings enter and prevent their longitudinal shifting.

Within each end of the tube is inserted a metal sleeve 13 having a shoulder 14, the sleeve 13 fitting tightly within the tube 9 and the tube 9 abutting against the shoulder 14. The ends of the strands of the braid 10 are bound tightly down over the shoulder 14 by means of the wire 15, the whole, namely the binding wire 15, the strands of the metal braid 10 and the sleeve 13, being securely soldered together. The construction and securing of the terminal or coupling to the conduit is the same at both ends so that the foregoing description in relation to one end applies to each. For the sake of lightness in aeroplane work the rings 11 might also be made of "Bakelite" or other suitable light material.

Figure 3:
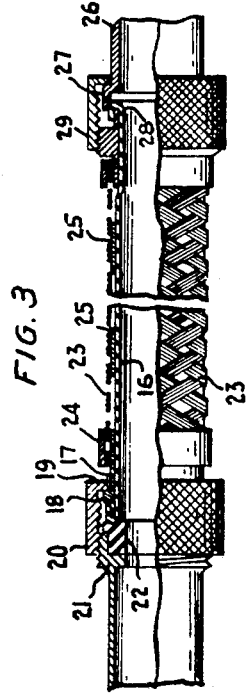
Fig. 3 is a side elevation, partly in axial section, of a still further modified form of conduit.

Referring now to Fig. 3, there is therein shown a conduit wherein the inner rubber-like tube may be withdrawn for inspection, replacement or repair, without dismantling the entire conduit. In the construction shown in this figure, the interior rubber-like tube 16 passes through the sleeve 17 of a coupling or terminal and is reflexed about the end of that sleeve as shown. Upon the sleeve is an outwardly extending shoulder 18 engaging with a flange 19 upon a swivel nut 20 in screw-threaded engagement with a pipe end 21. Between the pipe end 21 and the reflexed end of the rubber-like tube 16 is a gasket 22 of rubber-like or other suitable material which, by screwing up the nut 20, is caused to press firmly against the reflexed end of the tube 16, and form a tight joint therewith. About the tube 16 is a radio-shielding and mechanically-protecting and stress-absorbing metal braid 23 of a character as described in connection with the structures of the preceding figures. The ends of the strands of this braid 23 are included between the metal tube 17 and an encircling metal ring 24, the ring, strands and sleeve being securely fastened together by soldering.

To hold the metal braid 23 against elongation or reduction in diameter under stresses applied to it, supporting rings 25 are longitudinally distributed along the conduit within the braid and encircling tube 16. These rings, when of metal, may be held in properly distributed position by spot soldering to the braid as referred to in connection with Fig. 1, or if, in the interest of less weight, these rings are of "Bakelite" or other suitable material, they may be held in their distributed positions by any suitable means if indeed anything further is necessary than the engagement of the parts occasioned by the tight binding down of the braid 23 upon them. At the other end of the conduit of Fig. 3 the structure of the terminal is similar except that the joint of the connected pipe 26 with the conduit is made tight by forcing the flange 27 on that pipe tightly against the reflexed end 28 of the tube 16 by tightening up the nut 29.

Figure 4:
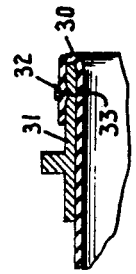
Fig. 4 is a fragmentary view, on an enlarged scale, showing the manner of securing the rubber-like tube of the conduit to a terminal.

Referring to Fig. 4, the reflexed end of the rubber-like tube 30 about the edge of the coupling 31 may be secured by a split ring 32 which, by its spring action, forces the tube into the circumferential groove 33 in the coupling.

Figure 5:
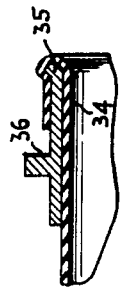
Fig. 5 is a fragmentary view, on the same scale as Fig. 4, illustrating another manner of securing the rubber-like hose to a terminal coupling.

In the manner of connection shown in Fig. 5, the rubber-like tube 34 may be reflexed about a shoulder 35 on the coupling member 36, when the elasticity of the reflexed portion will hold it tightly about the circumference of the coupling 36 and thus prevent its removal over the shoulder 35.

While the invention has been illustrated in what are considered its best applications, it may have other embodiments without departing from its spirit and is not, therefore, limited to the structures shown in the drawing.

What I claim is:

1. A radio-shielded conduit comprising in combination a flexible tube of rubber-like material, a tubular, braided, metal covering outside said tube and a plurality of longitudinally distributed, independent rings within said covering providing supporting means concentric with said tube and permitting longitudinal flexing of the conduit and resisting collapse of the same, and a terminal at each end of said conduit to which said braided covering is secured.

2. A radio-shielded conduit comprising in combination a flexible tube of rubber-like material, a tubular, braided, metal covering outside of said tube and a plurality of longitudinally distributed, independent, supporting rings outside said tube and within said covering and resisting collapse of the conduit.

3. A radio-shielded conduit comprising in combination a flexible tube of rubber-like material, a tubular, braided, metal covering outside said tube and a plurality of independent, longitudinally distributed rings within said tube and resisting collapse of the conduit.

4. A radio-shielded conduit comprising in combination a flexible tube of rubber-like material, a tubular, braided, metal covering outside said tube, a plurality of independent, longitudinally distributed rings outside said tube and within said covering and a plurality of independent, longitudinally distributed rings within said tube, said rings resisting collapse of the conduit.

5. A radio-shielded conduit comprising in combination a flexible tube of rubber-like material, a tubular, braided, metal covering outside said tube, a plurality of independent, longitudinally distributed rings outside said tube and within said covering and a plurality of independent, longitudinally distributed rings within said tube, the said rings outside said tube being staggered with relation to said rings upon the inside of said tube, said rings resisting collapse of the conduit.

6. A radio-shielded conduit comprising in combination a flexible tube of rubber-like material, a tubular, braided, metal covering outside said tube, a plurality of separate, longitudinally distributed rings outside said tube and within said covering and a plurality of separate, longitudinally distributed rings within said tube, the said rings upon the outside of said tube being of metal and the said rings upon the inside of said tube being of electrical insulating material, said rings upon the outside of said tube being staggered with relation to the said rings upon the inside of said tube.

R. HARRY STONE.